United States Patent
Mannen et al.

(10) Patent No.: US 7,039,758 B2
(45) Date of Patent: May 2, 2006

(54) DISK ARRAY SYSTEM BASED ON DISKS WITH A FIXED-LENGTH UNIT OF ACCESS

(75) Inventors: Akihiro Mannen, Yokohama (JP);
Naoto Matsunami, Hayama (JP);
Ikuya Yagisawa, Tokyo (JP);
Masahiko Sato, Odawara (JP);
Masahiro Arai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 312 days.

(21) Appl. No.: 10/443,886

(22) Filed: May 23, 2003

(65) Prior Publication Data

US 2005/0071553 A1 Mar. 31, 2005

(30) Foreign Application Priority Data

Mar. 25, 2003 (JP) ............................. 2003-081717

(51) Int. Cl.
*G06F 12/00* (2006.01)
(52) U.S. Cl. ......................... 711/114; 711/170; 711/112
(58) Field of Classification Search ............... 711/113, 711/114
See application file for complete search history.

(56) References Cited

U.S. PATENT DOCUMENTS

| | | | |
|---|---|---|---|
| 5,588,012 A | | 12/1996 | Oizumi |
| 6,269,464 B1 * | | 7/2001 | Boussina et al. ........... 714/752 |
| 6,324,604 B1 * | | 11/2001 | Don et al. ................ 710/74 |
| 2002/0124137 A1 * | | 9/2002 | Ulrich et al. .............. 711/113 |
| 2002/0156974 A1 * | | 10/2002 | Ulrich et al. .............. 711/114 |
| 2002/0161972 A1 * | | 10/2002 | Talagala et al. ............ 711/114 |
| 2003/0120864 A1 * | | 6/2003 | Lee et al. ................. 711/114 |

FOREIGN PATENT DOCUMENTS

| | | |
|---|---|---|
| EP | 0569313 | 11/1993 |
| EP | 0601699 | 6/1994 |
| JP | 2000-347815 | 12/2000 |
| JP | 2001-202295 | 7/2001 |

OTHER PUBLICATIONS

"A Case for Redundant Arrays of Inexpensive Disks (RAID)", David A. Patterson et al, Proceeds of the 1988 ACM Sigmod International Conference on Management of Data, PP. 109-116.

* cited by examiner

*Primary Examiner*—Matthew Kim
*Assistant Examiner*—Jonathan Barton
(74) *Attorney, Agent, or Firm*—Mattingly, Stanger, Malur & Brundidge, P.C.

(57) ABSTRACT

Conventional methods for appending a validation code are not applicable to a disk array system in which the disk array comprises disk devices having a fixed sector length. The present invention solves this problem by separating validation codes from data blocks, bundling them together in blocks that can be easily matched with sectors, and carrying out all the associated management and control by hardware, such as coordination between validation codes and data blocks and operations of reading from and writing into the disk devices, thereby offering the same level of reliability as with conventional systems.

18 Claims, 5 Drawing Sheets

DISK ARRAY SYSTEM BASED ON DISKS WITH A FIXED-LENGTH UNIT OF ACCESS

BACKGROUND OF THE INVENTION

1. Field of the Invention

The present invention relates to a method for controlling a disk array system which is used for data storage in a computer system, and more specifically, to a method for enhancing the reliability of a disk array system which uses as the storage media a set of disk devices with access units of a fixed length.

2. Description of the Related Art

A disk array system, also referred to as a RAID (Redundant Array of Inexpensive Disks), is basically composed of a number of disk devices organized as an array. In a disk array system, a request from a host computer to read or write data is executed on more than one disk device in parallel, resulting in faster input/output processing. Furthermore, it is common to append redundant data to the data stored in the disks, which inherently enhances reliability. Disk array systems are categorized into five levels depending on their system configuration (how the disks are organized) and the kind of redundant data appended. The technologies involved in disk array systems are outlined in "A Case for Redundant Arrays of Inexpensive Disks (RAID)," David A. Patterson, et al, Proceedings of the 1988 ACM SIGMOD International Conference on Management of Data, pp. 109–116.

Two features are essential in disk array systems: data chopping and data assembling. In writing into a disk array system, the write request from the host needs to be translated into multiple requests for multiple disk devices and the data should be divided into multiple pieces, which are then stored into multiple disk devices (data chopping), whereas in reading from a disk array system, the read request from the host needs to be translated into multiple requests to multiple disk devices and the small pieces of data read out of multiple disk devices should be assembled into a more meaningful block of data (data assembling). Data chopping and data assembling are generically called herein disk array control.

In most disk array systems, for reliability considerations, a redundant piece of information is appended to the original data and stored in the disk devices, so that in the event of a failure in one of the disk devices the original data can be restored. To further enhance the reliability of an entire disk array system, another feature known in the prior art is to append a validation code to each logical block of data. For example, as disclosed in Publication of Unexamined Patent Application Nos. 2001-202295 and 2000-347815, a validation code may consist of the logical address (LA) of the logical block and the longitudinal redundancy check (LRC), which is the result of a series of Exclusive-OR operations performed horizontally (longitudinally) on all the bytes or byte groups in the logical block. In a write operation, such a validation code is generated for each logical block of data and stored into the disks together with the data; in a read operation, a validation code is generated from the logical block of data being read and then compared with the validation code originally stored with that data. A mismatch would indicate that there has been a corruption in the address or the data.

SUMMARY OF THE INVENTION

An ordinary, conventional disk device has a fixed sector size of 512 bytes, and is accessed in units of a sector, which is the smallest unit of access.

On the other hand, typical disk array systems in the prior art use disk devices with variable sector sizes, such as SCSI (Small Computer System Interface) disks and PC (Fibre Channel) disks. In such a configuration, making the logical data block size 512 bytes, which is commonly used as the sector size in conventional disk devices, does not pose a problem. Even if 512 bytes is adopted as the logical data block length and an 8-byte validation code consisting of an LA (4 bytes) and an LRC (4 bytes) is appended, effectively expanding the unit of access to 520 bytes, it is possible to access the disk devices using 520 bytes as the sector size.

If, however, a disk array system is to be constructed of conventional disk devices with a fixed sector size of 512 bytes, the above-mentioned combination of the data block size and the validation code would cause a problem, since 520 bytes cannot be used as the sector size.

It is an object of the present invention to provide a means for appending a validation code in a disk array system comprising an array of disk devices with a fixed-length unit of access. It is another object of the present invention to provide a disk array system based on an array of disk devices having a fixed-length unit of access with a reliability level as high as that of conventional disk array systems based on an array of disk devices having a variable-length unit of access.

For these purposes, the disk array system based on an array of disk devices with a fixed-length unit of access is provided with a means to generate a validation code for each unit of access and a means to store the validation code and the original data in different parts of storage in the disk devices.

DESCRIPTION OF THE PREFERRED EMBODIMENT

The preferred embodiment is described here with reference to FIGS. 1 through 6.

The nature, objectives, and advantages of the present invention will become more apparent to those skilled in the art after considering the following detailed description of the preferred embodiment in connection with the accompanying drawings. It should be understood that the invention is not to be limited by the specific illustrated embodiment, but only by the scope of the appended claims.

Figure 1:
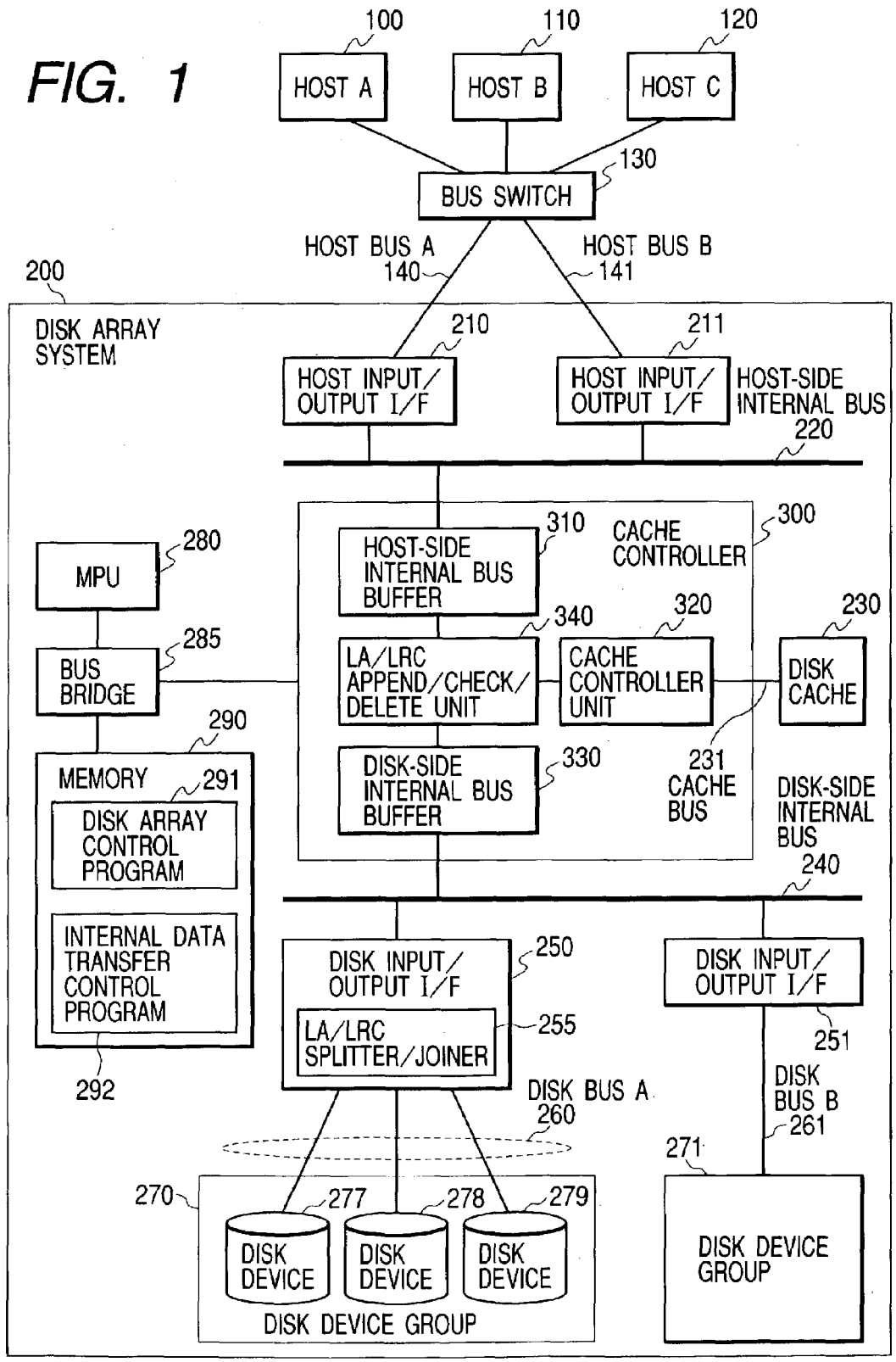
FIG. 1 illustrates the configuration of a computer system according to the preferred embodiment of the present invention.

First, the system configuration according to the preferred embodiment of the present invention is described below with reference to FIG. 1.

A host computer (hereinafter referred to simply as a host) A 100, a host B 110, and a host C 120 are apparatuses that issue read/write requests to a disk array system 200 and perform the associated input/output operations. These hosts are connected to the disk array system 200 through a bus switch 130.

The disk array system 200 comprises host input/output interfaces 210 and 211, a disk cache 230, disk input/output interfaces 250 and 251, disk device groups 270 and 271, a processor (MPU) 280 for controlling the overall operation of the disk array system, a bus bridge 285, a memory 290, and a cache controller 300. Each of the disk device groups 270 and 271 comprises more than one disk device. In the example shown in FIG. 1, the disk device group 270 comprises disk devices 277 through 279. Whereas two units or groups each of host input/output interfaces, disk input/output interfaces, and disk device groups are shown in FIG. 1, there could alternatively be one or any number of these units or groups as a variation of the preferred embodiment.

The host input/output interfaces, cache controller, MPU, bus bridge, memory, disk cache, and disk input/output interfaces are collectively referred to as a disk controller.

The host A 100, host B 110, and host C 120 are connected via a host bus A 140 and a host bus B 141 to the host input/output interfaces 210 and 211, respectively, in the disk array system 200. Whereas FIG. 1 shows three hosts, any number (except zero) of hosts can be connected to the disk array system 200.

Upon receiving an input/output (read/write) request from the host A 100, host B 110, or host C 120, either the host input/output interface 210 or host input/output interface 211, which effects data transfer between the host and the cache controller 300, is connected to the cache controller 300 via a host-side internal bus 220.

The disk input/output interfaces 250 and 251, which effect data transfers between the disk device groups 270 and 271 and the cache controller 300, are connected to the disk device groups 270 and 271 via a disk bus A 260 and a disk bus B 261, respectively, and also to the cache controller 300 via a disk-side internal bus 240. The disk input/output interface 250 contains an LA/LRC splitter/joiner 255 (to be described later), which splits or appends an LA and an LRC from or to the logical block of data transferred between the cache controller 300 and the disk device group 270. The disk input/output interface 251 has the same configuration and function with respect to the disk device group 271 as the disk input/output interface 250 with respect to the disk device group 270.

In the preferred embodiment of the present invention described here, the disk devices 277 through 279 are those with a fixed sector length of 512 bytes, such as ATA (AT Attachment) or SATA (Serial ATA) disks. Such disk devices have the advantage of being inexpensive: They are available at about one-third the prices of SCSI or FC disks, which have variable sector lengths. Hence, using such disk devices, it is possible to build inexpensive disk array systems. ATA and SATA disks, however, have limitations in the number of disk devices that can be connected to one bus. Up to two ATA disks or only one SATA disk can be connected to a single bus. Therefore, the disk input/output interfaces 250 and 251 should each be equipped with a sufficient number of ports to connect an appropriate number of disk bus A's 260 and B's 261, respectively, to accommodate all the disk devices in the system.

Whereas the description of the preferred embodiment assumes that the disk devices in the disk array system 200 have a fixed sector length of 512 bytes, any number, such as 2048 bytes, can alternatively be chosen as the fixed sector length.

The disk cache 230 is connected to the cache controller 300 via a cache bus 231.

The cache controller 300 comprises a host-side internal bus buffer 310, which buffers data transferred between the host input/output interfaces 210 and 211 and the disk cache 230, a cache control unit 320, which controls data transfer between the disk cache 230 and the cache controller 300, and a disk-side internal bus buffer 330, which buffers data transferred between the disk input/output interfaces 250 and 251 and the disk cache 230. The cache controller 300 further comprises an LA/LRC append/check/delete unit 340, which appends an LA and an LRC (to be described later) to the data transferred from the host input/output interfaces 210 and 211 to the disk cache 230, checks and deletes the LA and LRC appended to the data transferred from the disk cache 230 to the host input/output interfaces 210 and 211, and checks the LA and LRC appended to the data transferred between the disk cache 230 and the input/output interfaces 250 and 251.

The MPU 280 is connected to the memory 290 and the cache controller 300 via the bus bridge 285.

The memory 290 holds a disk array control program 291, which the MPU 280 uses to carry out disk array control, and an internal data transfer control program 292, which instructs the cache controller 300 to append an LA and also issues data transfer commands to the host input/output interfaces 210 and 211 or the disk input/output interfaces 250 and 251.

The LA and LRC are explained hereafter, followed by a description of how the LA/LRC append/check/delete unit 340 appends them to, checks them in, or deletes them from, the data being transferred.

The disk array system 200 according to the preferred embodiment breaks up the data received from a host computer into a number of logical blocks for management and processing. The smallest unit of management and processing is called a logical data block. It is assumed in the preferred embodiment that the size of the logical data block is 512 bytes, which is the smallest unit of read and write (i.e., sector size).

The LA/LRC append/check/delete unit 340 appends, to each logical data block, a validation code called an LA, which is 4 bytes in length and which contains part of the source address, so that any attempt to read from or write into an address not correctly associated with the logical data block can be detected. For a contiguous set of logical data blocks, the corresponding LAs are contiguous. The MPU 280 provides the LA/LRC append/check/delete unit 340 with an appropriate value, by executing the internal data transfer control program 292 stored in the memory 290. The LA/LRC append/check/delete unit 340 appends as the LA the value specified by the MPU 280 to the first of the logical data blocks generated from the input data by the cache controller 300, and to each subsequent logical data block, the value specified by the MPU 280 plus the number of logical data blocks preceding it.

The LRC, which is 4 bytes in length, is the result of Exclusive-OR operations performed longitudinally on all the 129 4-byte units, which altogether constitute the 516-byte composite of the original 512 bytes of the logical data block and the LA (4 bytes). The LA/LRC append/check/delete unit 340 calculates an LRC for the composite of each original data block and its associated LA and appends it to that composite to make an expanded data block of 520 bytes. Each time a block of data is read, written, or transferred, the LA/LRC append/check/delete unit 340 can detect a data bit error that has occurred inside the disk device or during the data transfer, by calculating an LRC for the composite of the data block and its associated LA and comparing it with the LRC that is appended to the data block.

More detailed descriptions of how the LA and LRC are appended, checked, and deleted are found in Publication of Unexamined Patent Application Nos. 2001-202295 and 2000-347815.

Figure 2:
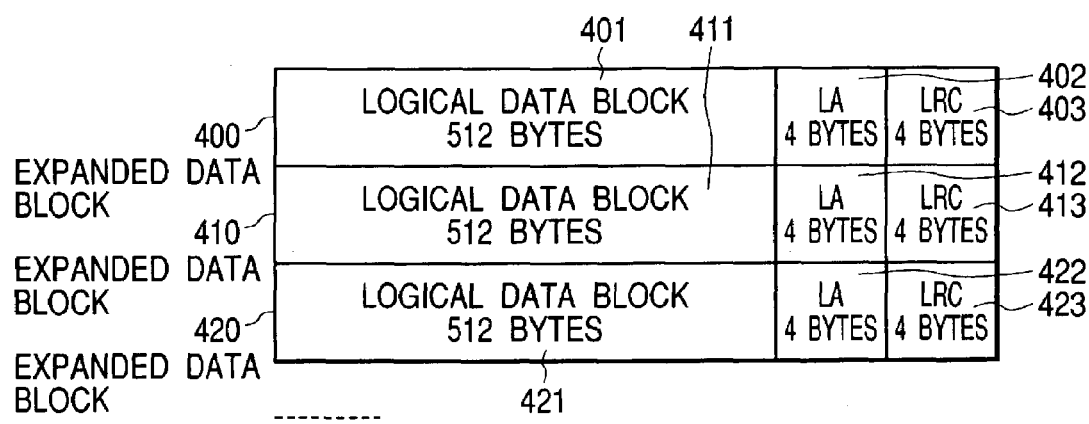
FIG. 2 shows an example of an expanded data block.

FIG. 2 shows how the LA/LRC append/check/delete unit 340 appends an LA and an LRC to data. A logical data block 401, a logical data block 411, and a logical data block 421 are a series of data blocks created by the cache controller 300 by chopping up a contiguous set of three logical data blocks constituting a piece of host data transferred from the host A 100 to the disk array system 200. LA 402, 4 bytes in length, is the LA for the logical data block 401 and is appended at the end of it. The result of 4-byte-wide Exclusive-OR operations performed longitudinally on the composite of the logical data block 401 and the LA 402 from byte position 1 to byte position 516 is appended as an LRC 403, also 4 bytes in length, to the right of the LA 402. LA 412 and LRC 413, and LA 422 and LRC 423, are the LAs and the LRCs corresponding to the logical data blocks 411 and 421, respectively, and are appended to them in the same way as the LA 402 and LRC 403. The logical data block 401, the LA 402, and the LRC 403 are collectively called an expanded data block 400, which is 520 bytes in length. Corresponding to logical data blocks 411 and 421, there are expanded data blocks 410 and 420, respectively.

The LA/LRC append/check/delete unit 340 appends an LA and an LRC during a data transfer from the host interface 210 or 211 to the disk cache 230. During a data transfer from the disk cache 230 to the host interface 210 or 211, the LA/LRC append/check/delete unit 340 checks whether there is an error in the LA or LRC in the expanded data block read out of the disk cache, and if there is no error, deletes the LA and LRC (8 bytes in total) out of the expanded data block. The cache controller 300 then sends only the data portion, which is the original 512-byte logical data block, to the host interface 210 or 211. Thus, the host-side internal bus 220 carries logical data blocks, whereas the cache bus 231 and the disk-side internal bus 240 carries expanded data blocks.

The data transferred between the disk cache 230 and the disk input/output interfaces 250 and 251 is in expanded format. During a data transfer between the disk cache 230 and the disk input/output interface 250 or 251, the LA/LRC append/check/delete unit 340 checks whether there is an error in LA or LRC, and if there is no error, lets the data transfer continue. If there is an error, the LA/LRC append/check/delete unit 340 does not perform the deletion but simply notifies the MPU 280, which in turn handles it by an error handling routine.

The LA/LRC splitter/joiner 255, which is included in each of the disk input/output interfaces 250 and 251, is described below, followed by an explanation of how data blocks, LAs, and LRCs are stored onto a disk device with a fixed sector length of 512 bytes. Since the disk devices used in the preferred embodiment have a fixed sector length of 512 bytes, the smallest unit of read or write operation from or to them is 512 bytes. Therefore, an expanded data block, 520 bytes in length, does not fit within a block on the disk. The validation code, which consists of the LA and the LRC, is 8 bytes in length and is too small to occupy one block on the disk. If the validation code is to be stored into the disk each time a logical data block is stored, then 504 bytes, which is 512 bytes minus 8 bytes, would be meaningless data for each additional block of the validation code, resulting in a significant waste of disk space.

Figure 3:
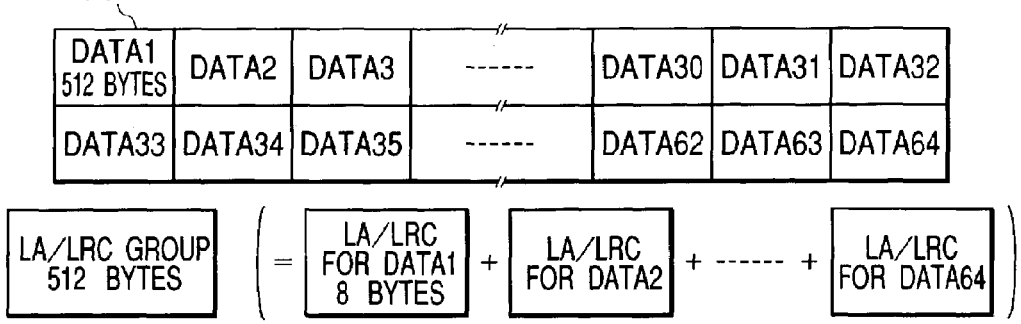
FIG. 3 shows an example of an LA/LRC group.

The preferred embodiment of the present invention solves this problem of wasted disk space by collectively managing the validation codes for multiple logical data blocks, as shown in FIG. 3. Since 64 times 8 is 512, the LA/LRC splitter/joiner 255 puts together 64 validation codes corresponding to 64 logical data blocks to form one 512-byte LA/LRC group, which neatly fits in one sector.

Figure 4:
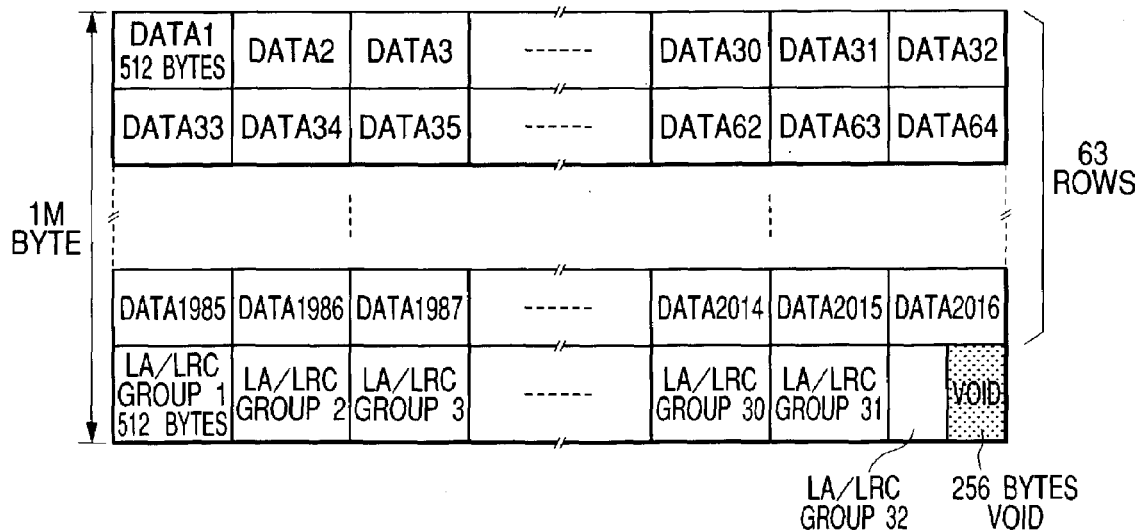
FIG. 4 shows an example of how logical data blocks and LA/LRC groups are laid out inside a disk device group.

More specifically, each of the disk input/output interfaces 250 and 251 arranges data and validation codes in units of 1 M byte (=1,024×1,024 bytes) as shown in FIG. 4, such that 2,016 logical data blocks are stored into the first 2,016 sectors and their corresponding validation codes (LAs and LRCs) are stored into the remaining 32 sectors. LA/LRC group 1 is a collection of 64 validation codes corresponding to 64 logical data blocks from DATA1 through DATA64; similarly, LA/LRC group 2 is a collection of 64 validation codes corresponding to 64 logical data blocks from DATA65 through DATA128. Of the 2,048 sectors constituting 1 M byte, 2,016 are data blocks, which correspond to 31.5 (=2,016 divided by 64) LA/LRC groups. Therefore, LA/LRC group 32 is only half-full: 256 bytes are real LAs and LRCs, while the other 256 bytes are void.

In the arrangement shown in FIG. 4, the location of the validation code on the disk corresponding to a given logical data block can be easily determined using a mathematical procedure. Letting the integer portion of the expression (X/64)+1 be Y, the 8-byte validation code for a given logical data block DATAX is found at 8×{(X mod 64)−1}in the LA/LRC group #Y. If the result of the latter formula is negative (i.e., X is an integral multiple of 64), it means that the corresponding validation code is found in the final 8-byte position in the LA/LRC group #(Y−1).

For example, the validation code for DATA127 can be found at byte position 496 (=8×{(127 mod 64)−1=62}) in the LA/LRC group #2 (=integer portion of (127/64)+1). Thus, within a 1 M byte integral boundary, the position of the validation code for a given logical data block can be calculated mathematically.

The LA/LRC splitter/joiner 255 contains a 512-byte buffer that can accommodate one LA/LRC group. As explained above, one LA/LRC group contains validation blocks for 64 logical data blocks. The LA/LRC splitter/joiner 255 therefore manages 64 logical data blocks and their corresponding validation codes as a group, for which one unique group number is assigned.

There are a variety of possible ways of assigning group numbers. For example, the LA/LRC splitter/joiner 255 may give an arbitrary number Z to a combination of a group of logical data blocks and their corresponding LA/LRC group.

Alternatively, the group number may be determined by the LA, which includes the logical address. Since contiguous logical data blocks have contiguous LAs, the LAs corresponding to the logical data blocks that belong to the same group are considered contiguous also. Therefore, if a logical data block has the same value for Z', which is the integer portion of the quotient of (LA divided by 64), as another logical data block, then the two logical data blocks are considered to correspond to the same LA/LRC group, i.e., considered to belong to the same logical data block group. Hence, the value of Z' can be used as the group number that is given to the logical data block and its corresponding LA/LRC group.

Still another way of determining the group number would be to use the address that is specified during a data transfer to identify the logical data block to be transferred. Logical data blocks belonging to the same group are stored within a contiguous area of 32 K bytes, which is 64 times 512 bytes, on a disk. Therefore, a data transfer to an address that is 32 K or more bytes apart means a transfer to a logical data block belonging to another logical data block group. Thus, it is possible to use as the origin the location of the first logical data block of one logical data block group inside a disk device and to use as the group number the integer part of the quotient (Z") of [the difference in bytes between the origin and the location on the disk device designated by the logical data block address] divided by 32 K bytes.

Figure 5:
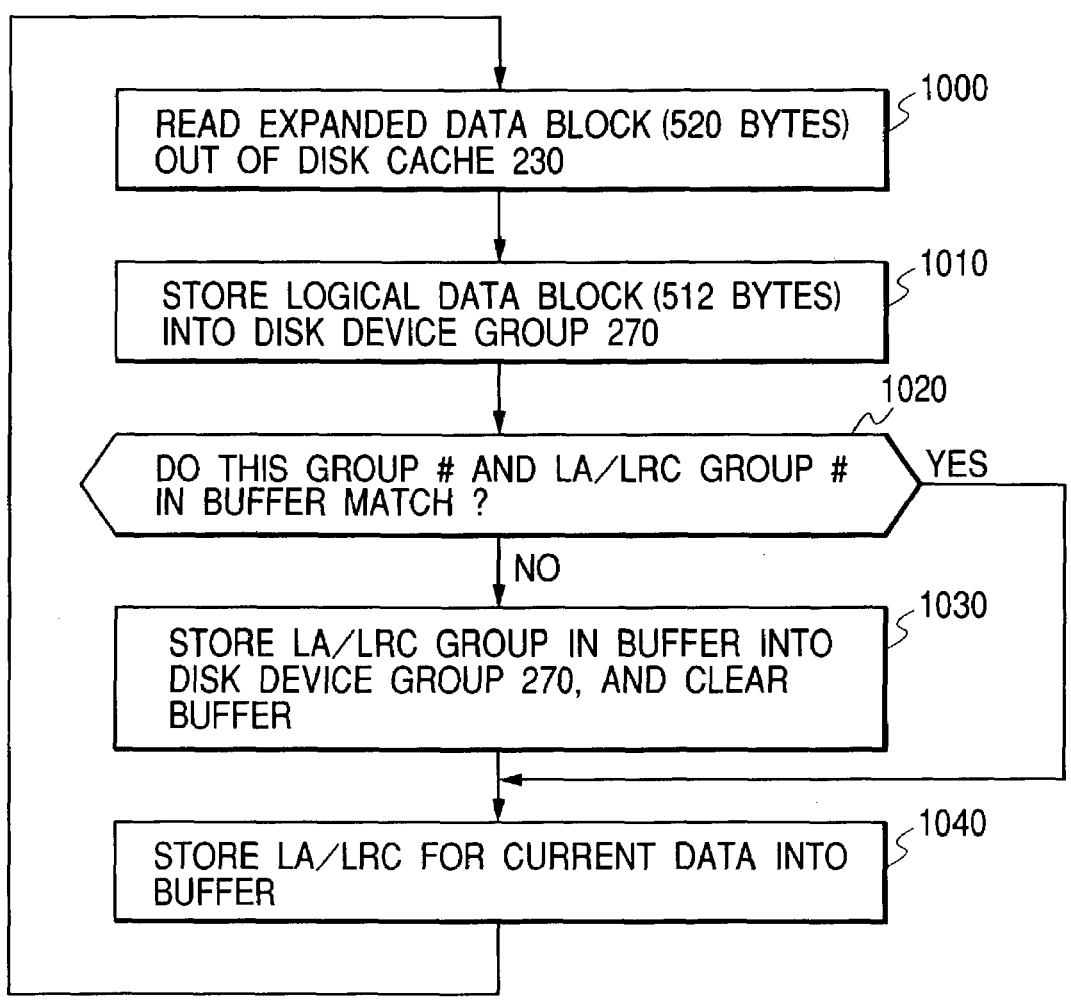
FIG. 5 is a flowchart showing the process of data transfer from the disk cache to the disk device group.

The process flow of a data transfer from the disk cache 230 to the disk device group 270 inside the disk input/output interface 250 is described below with reference to FIG. 5.

The disk input/output interface 250 contains an internal buffer to accommodate a 520-byte expanded data block. Upon receiving a command issued by the MPU 280 for data transfer from the disk cache 230 to the disk device group 270, the disk input/output interface 250 reads the 520-byte expanded data block, which consists of the logical data block and its validation code (LA and LRC), from the disk cache 230 into its internal buffer (step 1000). The LA/LRC splitter/joiner 255 splits the expanded data block into a 512-byte logical data block and an 8-byte validation code (LA and LRC) and stores only the logical data block into the disk device group 270 (step 1010).

The LA/LRC splitter/joiner 255 then compares the group number corresponding to the logical data block stored into the disk device group in step 1010 with the group number corresponding to the validation code (LA and LRC) stored in its internal buffer during the previous expanded data block transfer (step 1020). If they do not match, which means that the validation codes (LAs and LRCs) in the internal buffer belong to the group pertaining to the immediately preceding data transfer(s) but do not belong to the same group as the data block currently being transferred, the disk input/output interface 250 stores the validation codes held in the internal buffer into the disk device group 270 and clears the internal buffer (step 1030). The LA/LRC splitter/joiner 255 then copies the validation code for the logical data block that has just been stored into the disk device group 270 in step 1010 from the internal buffer of the disk input/output interface 250 into its own internal buffer (step 1040) and goes back to step 1000 to continue the data transfer operation.

If the two group numbers match in step 1020, which means that the validation codes (LAs and LRCs) in the internal buffer belong to the same group as the data that has just been stored into the disk device group 270 in step 1010, the LA/LRC splitter/joiner 255 copies the validation code for the logical data block that has just been stored into the disk device group 270 in step 1010 from the internal buffer of the disk input/output interface 250 into its own internal buffer (step 1040), and goes back to step 1000 to continue the data transfer operation. Similarly, at the very start of a data transfer when the internal buffer of the LA/LRC splitter/joiner 255 is empty, it copies the validation code for the logical data block that has just been stored into the disk device group 270 from the internal buffer of the disk input/output interface 250 into its own internal buffer (step 1040), and goes back to step 1000 to continue the data transfer operation.

The above operation is repeated until all the data that the MPU 280 requested to be transferred has been exhausted. Upon completion of the data transfer, the contents of the internal buffer are stored into the disk device group 270 and the internal buffer is cleared.

Storing the validation codes (LAs and LRCs) for data in a new transfer operation into the disk device group 270 which already holds data belonging to the same data block group would result in the destruction of those LAs and LRCs corresponding to them. To prevent such a problem, it is necessary to ensure that if the disk device group 270 already holds data belonging to the same data block group as the data to be transferred by a new command, the validation codes (LAs and LRCs) corresponding to the old data are first fetched into the internal buffer and then merged with those for the new data.

Another solution to this problem would be to make the unit of data handling in the disk cache a multiple of the size of a logical data block group, e.g., 32 K bytes or 64 K bytes if the size of a logical data block group is 32 K bytes. If the write operation ordered by the host is for data shorter than this unit, e.g., 512 bytes, then the entire 32-K byte block covering the 512-byte area (the destination of the write operation) is fetched first from the disk device group into the disk cache, where new data is then stored. In this kind of arrangement, the unit of data write (store) into the disk device group is also the unit of data handling in the disk cache. Accordingly, if the unit of data handling in the disk cache is 32 K bytes, then the write (store) operation into the disk device group is always in units of a logical data block group, which eliminates the need for the merge operation described previously.

Figure 6:
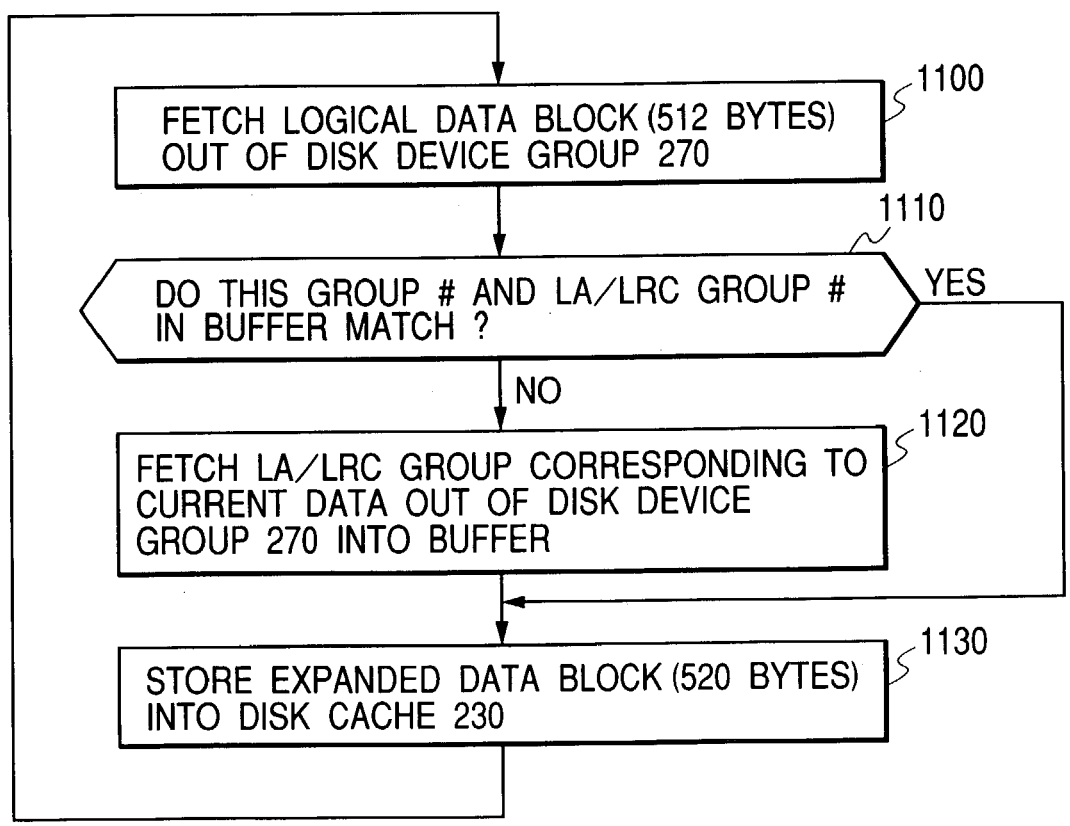
FIG. 6 is a flowchart showing the process of data transfer from the disk device group to the disk cache.

The process flow of how the disk input/output interface 250 transfers data from the disk device group 270 to the disk cache 230 is described below with reference to FIG. 6.

Upon receiving a command issued by the MPU 280 for data transfer from the disk device group 270 to the disk cache 230, the disk input/output interface 250 reads the 512-byte logical data block from the disk cache 230 into its internal buffer (step 1100). The disk input/output interface 250 then compares the group number corresponding to the logical data block just fetched with the group number corresponding to the validation codes (LAs and LRCs) stored in the internal buffer of the LA/LRC splitter/joiner 255 (step 1110).

If these group numbers do not match or if the internal buffer of the LA/LRC splitter/joiner 255 is empty because this is the very beginning of the write operation, the disk input/output interface 250 fetches the 512-byte LA/LRC group, which corresponds to the logical data block read into its own internal buffer in step 1100, from the disk device into the internal buffer of the LA/LRC splitter/joiner 255 (step 1120).

A match between the two group numbers in step 1110 means that the validation codes (LAs and LRCs) for the logical data block fetched in step 1100 are already present in the internal buffer. The LA/LRC splitter/joiner 255 combines the logical data block fetched in step 1100 and its validation code (LA and LRC) (held in the internal buffer) into a 520-byte expanded data block and stores it into the disk cache 230 (step 1130), and goes back to step 1100 to continue the data transfer operation.

The above operation is repeated until all the data that the MPU 280 requested to be transferred has been exhausted.

The foregoing descriptions of the preferred embodiment of the present invention have demonstrated that even in a disk array system 200 based on disk devices with a fixed sector length of 512 bytes, it is possible to append an 8-byte validation code (LA and LRC) to a 512-byte logical data block, as is done in most conventional disk array systems. A number of validation codes are put together to fit into one sector and are stored in the disk separately from their corresponding logical data blocks, unlike in conventional disk array systems. This situation is managed by providing a set of means and mechanisms for managing the correspondence between logical data blocks and validation codes, calculating the storage location of the validation code, splitting and joining the logical data block and the validation code, and storing and fetching validation codes to and from the disk devices. All these means and mechanisms are implemented by hardware (the LA/LRC splitter/joiner), which eliminates chances of failure due to software errors, thereby ensuring the same level of quality of detecting and handling corruptions in address and data in the disk devices as in conventional disk array systems.

Whereas the preferred embodiment has assumed that the LA/LRC splitter/joiner is implemented by hardware, it would alternatively be possible to provide the disk input/output interface with a microprocessor and a memory and to have a program held in the memory perform the functions of the LA/LRC splitter/joiner.

As the interface between the host A 100, host B 110, or host C 120 and the host input/output interface 210 or host input/output interface 211, typically the Fiber Channel or SCSI is employed, but other interfaces may also be used. The host-side internal bus 220 and the disk-side internal bus 240 may be a 64-bit PCI bus, a 32-bit PCI bus, or any other suitable bus.

Although the preferred embodiment has assumed that the sector length of the disk devices in the disk array system 200 and the size of the logical data block are both 512 bytes, and that the size of the validation code is 8 bytes, other values can also be chosen for these parameters without departing from the spirit and scope of the present invention.

It is also possible to have the disk input/output interface check the validation code (LA and LRC) in the expanded data block being transferred and thus detect misaddressing and data corruptions that have occurred inside the disk devices, on the disk bus, on the disk-side internal bus, or anywhere else.

Whereas the preferred embodiment discussed here locates the LA/LRC splitter/joiner inside the disk input/output interface, other alternative implementations may be used. For example, in a disk array system where the Fiber Channel is used as the disk input/output interface, outboard JBODs that are connected via Fiber Channels are employed as the disk devices, and such outboard JBODs include a Fiber Channel to SATA protocol converter to support SATA disks, it is possible to implement the functions described herein by incorporating the LA/LRC splitter/joiner into the Fiber Channel to SATA protocol converter.

Whereas in the preferred embodiment discussed here, the functions described above are primarily carried out by the LA/LRC splitter/joiner in the disk input/output interface, alternative implementations can be envisaged. For example, by laying out the logical data blocks and their corresponding validation codes in the disk cache as shown in FIG. 4 and by having an internal data transfer control program find the location of the validation code (LA and LRC) corresponding to the logical data block and direct the disk input/output interface to transfer validation codes together with their corresponding logical data blocks, the same features as described above can be realized.

If 504 bytes is chosen as the size of the logical data block so that the expanded data block combining the logical data block with a 4-byte LA and a 4-byte LRC is 512 bytes long (the fixed sector length), then the same features can be realized without requiring the LA/LRC splitter/joiner.

Thus the present invention provides a means for appending validation codes to logical data blocks and storing them together in disk devices, even in a disk array system comprising an array of disk devices with a fixed-length unit of access. As a result, it is possible to build a highly reliable disk array system based on relatively inexpensive disk devices with a fixed-length unit of access.

What is claimed is:

1. A disk array system designed for connection to one or more computers comprising:
    one or more host input/output interfaces for connection to said one or more computers;
    a plurality of disk devices with a fixed-length unit of access;
    one or more disk input/output interfaces for connection to said plurality of disk devices;
    a cache for temporarily holding data to be transferred between one of said computers and said plurality of disk devices; and
    a cache controller that controls the input/output of data from/to said cache;
    wherein said cache controller divides data of a first form received from one of said computers into a plurality of blocks each having the size of said unit of access and each being called a piece of data of a second form, appends a validation code to each piece of said data of the second form, and stores all of said pieces of data of the second form together with their corresponding validation codes into said cache; and
    wherein said disk input/output interface stores both data of the second form and the validation codes appended to it into one of said plurality of disk devices,
    wherein said disk input/output interface splits data read from said cache into data of the second form and the validation codes appended to it and stores the data of the second form and the corresponding validation codes into separate areas of one or more of said plurality of disks, each said area having a size of the unit of access, wherein a plurality of validation codes are stored into a single area having the size of the unit of access so as to reduce an amount of storage space occupied by the validation codes.

2. The disk array system of claim 1, wherein said unit of access is a sector of said disk device.

3. The disk array system of claim 2, wherein said disk input/output interface reads out of said cache data of the second form and the validation codes appended to it and stores them separately into different sectors, which may be located in one or more of said disk devices.

4. The disk array system of claim 3, wherein said disk input/output interface stores in one sector a plurality of validation codes corresponding to different pieces of data of the second form.

5. The disk array system of claim 4, wherein said fixed-length unit of access is 512 bytes.

6. The disk array system of claim 4, wherein said plurality of disk devices are ATA disks or SATA disks.

7. The disk array system of claim 4, wherein said disk input/output interface fetches data of the second form and its corresponding validation codes out of two different sectors where they are stored and transfers both of them as a pair to said cache.

8. The disk array system of claim 7, wherein said cache controller reads a piece of data of the second form and its corresponding validation code out of said cache, performs a validation check using the validation code, and if there is no error, transfers said piece of data of the second form to one of said host input/output interfaces for further transfer to one of said computers.

9. A disk array system designed for connection to one or more computers and for storing data accessed by said computers, comprising:

a plurality of disk devices with a fixed-length unit of access for storing data to be accessed by a computer; and a disk controller that receives access commands from said computer and controls, in accordance with said access commands, the input/output operation with said plurality of disk devices;

wherein said disk controller divides data received from said computer into a number of data blocks, each having the size of said fixed-length unit of access, and appends a validation code to each such data block, wherein a disk input/output interface divides the data blocks from the validation codes appended thereto and stores the data blocks and corresponding validation codes into separate areas, and stores a plurality of validation codes corresponding to a plurality of contiguous data blocks into one sector, and wherein a plurality of validation codes are stored into a single area having a size of the unit of access so as to reduce an amount storage space occupied by the validation codes.

10. The disk array system of claim 9, wherein said plurality of disk devices are accessed sector by sector and said disk controller stores data blocks, each having the size of a sector, and the validation codes for said data blocks into different sectors, which may be located in one or more of said disk devices.

11. The disk array system of claim 9, wherein said plurality of disk devices are ATA or SATA disk devices.

12. A data storing method, by which a disk array system comprising a number of disk devices having a fixed-length unit of access appends validation codes to data received from a computer and stores said received data together with said appended validation codes into said disk devices, said data storing method comprising:

a step for receiving data from said computer;

a step for dividing data received from said computer into a number of data blocks, each having the size of said fixed-length unit of access of said disk devices;

a step for generating an expanded data block by appending a validation code to each of said data blocks; and a data storing step in which said expanded data blocks are stored into said disk devices, wherein said data storing step further comprises a step for dividing, by a disk input/output interface, each of said expanded data blocks into a data block and a validation code, and a step for storing, by the disk input/output interface, said data blocks and said validation codes into different sectors, which may be located in one or more of said disk devices, and wherein a plurality of validation codes are stored into a single area having the size of the unit of access so as to reduce an amount of storage space occupied by the validation codes.

13. The data storing method of claim 12, wherein said unit of access is a sector of said disk device.

14. The data storing method of claim 13, wherein said plurality of disk devices are ATA or SATA disk devices.

15. The data storing method of claim 13, wherein a step for performing a validity check using the validation code is added to the step for storing said data blocks and said validation codes into said disk devices.

16. The disk array system of claim 1, wherein said disk input/output interface manages a relationship between each of the data of the second form and each of the corresponding validation codes for correlating each data of the second form with the validation code that corresponds to each data of the second form for enabling each validation code to be matched with its corresponding data of the second form during data access.

17. The disk array system of claim 9, wherein said disk input/output interface manages a relationship between each of the data blocks and each of the corresponding validation codes for correlating each data block with the validation code that corresponds to each data block for enabling each validation code to be matched with its corresponding particular data block during data access.

18. The data storing method of claim 12, further including the step wherein said disk input/output interface manages a relationship between each of the data blocks and each of the corresponding validation codes for correlating each data block with the validation code that corresponds to each data block for enabling each validation code to be matched with its corresponding data block during data access.

* * * * *